(12) United States Patent
Beers et al.

(10) Patent No.: US 11,773,870 B1
(45) Date of Patent: Oct. 3, 2023

(54) VARIABLE CHANNEL DIFFUSER

(71) Applicant: Hamilton Sundstrand Corporation, Charlotte, NC (US)

(72) Inventors: Craig M. Beers, Wethersfield, CT (US); Brent J. Merritt, Southwick, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/942,963

(22) Filed: Sep. 12, 2022

(51) Int. Cl.
| | |
|---|---|
| *F04D 29/44* | (2006.01) |
| *B64D 13/06* | (2006.01) |
| *F01D 17/18* | (2006.01) |
| *F01D 17/14* | (2006.01) |
| *F04D 29/46* | (2006.01) |
| *F01D 17/08* | (2006.01) |
| *F16K 11/065* | (2006.01) |

(52) U.S. Cl.
CPC ........... *F04D 29/444* (2013.01); *B64D 13/06* (2013.01); *F01D 17/08* (2013.01); *F01D 17/143* (2013.01); *F01D 17/145* (2013.01); *F01D 17/18* (2013.01); *F04D 29/464* (2013.01); *B64D 2013/0603* (2013.01); *F16K 11/065* (2013.01)

(58) Field of Classification Search
CPC ...... F04D 17/08; F04D 17/141; F04D 17/143; F04D 17/145; F04D 17/165; F04D 17/18; F04D 29/462; F04D 29/464; B64D 13/02; B64D 13/04; B64D 2013/0603; B64D 2013/0618; B64D 13/08; F01D 17/08; F01D 17/141; F01D 17/143; F01D 17/145; F01D 17/165; F01D 17/18
See application file for complete search history.

(56) References Cited

U.S. PATENT DOCUMENTS

| | | | |
|---|---|---|---|
| 2,996,996 A | 8/1961 | Kurt | |
| 3,032,259 A | 5/1962 | Kurt | |
| 3,826,586 A * | 7/1974 | Richards | ............. F04D 15/0038 415/13 |
| 4,292,807 A | 10/1981 | Rannenberg | |
| 4,460,310 A * | 7/1984 | Plunkett | ............. F04D 27/0246 415/48 |
| 4,844,690 A | 7/1989 | Delaurier et al. | |
| 7,326,027 B1 | 2/2008 | Skoch et al. | |
| 8,689,552 B2 | 4/2014 | Iwata | |

(Continued)

FOREIGN PATENT DOCUMENTS

JP 2014-118925 A * 6/2014 ........... F04D 29/462

OTHER PUBLICATIONS

English machine translation of JP-2014-118925-A, Dec. 17, 2022.*

*Primary Examiner* — Christopher Verdier
(74) *Attorney, Agent, or Firm* — Kinney & Lange, P.A.

(57) ABSTRACT

A variable diffuser includes a backing plate, a shroud, a first divider between the backing plate and the shroud, a first diffuser channel between the backing plate and the first divider, a second diffuser channel between the first divider and the shroud, the second diffuser channel, and a valve controlling flow through the second diffuser channel. The valve moves between a first position and a second position. The first diffuser channel includes a first channel inlet and a first outlet. The second diffuser channel includes a second channel inlet adjacent to the first channel inlet and a second outlet adjacent to the first outlet.

20 Claims, 7 Drawing Sheets

(56) References Cited

U.S. PATENT DOCUMENTS

| | | |
|---|---|---|
| 9,212,667 B2 | 12/2015 | Sun et al. |
| 10,378,553 B2 | 8/2019 | Sommer et al. |
| 10,753,370 B2 | 8/2020 | Hall et al. |
| 11,125,247 B2 | 9/2021 | Drolet |
| 2011/0103938 A1* | 5/2011 | Holroyd ................ F01D 17/143 |
| | | 29/888.024 |
| 2011/0194929 A1* | 8/2011 | Denholm .............. F01D 17/165 |
| | | 415/157 |
| 2012/0251298 A1* | 10/2012 | Moore .................. F01D 17/143 |
| | | 415/157 |
| 2013/0064682 A1* | 3/2013 | Sun ........................ F04D 15/00 |
| | | 417/18 |
| 2014/0328667 A1 | 11/2014 | Sommer et al. |
| 2017/0167292 A1 | 6/2017 | Army et al. |
| 2021/0348622 A1 | 11/2021 | Liu et al. |

\* cited by examiner

VARIABLE CHANNEL DIFFUSER

BACKGROUND

The present disclosure relates to aircraft environmental control systems. More specifically, the present disclosure relates to a vane for a variable diffuser in a cabin air compressor.

Air cycle machines are used in environmental control systems in aircraft to condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressured air sufficiently that it must be cooled, even if the ambient air temperature is very low. Thus, under most conditions, heat must be removed from air by the air cycle machine before the air is delivered to the aircraft cabin.

A cabin air compressor can be used to compress air for use in an environmental control system. The cabin air compressor includes a motor to drive a compressor section that in turn compresses air flowing through the cabin air compressor. A variable diffuser is also positioned in the cabin air compressor. A variable diffuser typically requires a plurality of vanes that are configured to pivot about a point to vary the size of a gap between adjacent vanes and vary the flow of air through the diffuser. The plurality of vanes typically pivot against a shroud or a backing plate of the variable diffuser. Moving the vanes against the backing plate or the shroud increases wear on the vanes, leading to more repairs. Further, a traditional variable diffuser has many vanes and each vane requires multiple parts to move. High part counts increase the cost of building and maintaining the variable diffuser.

SUMMARY

A variable diffuser includes a backing plate, a shroud, a first divider between the backing plate and the shroud, a first diffuser channel between the backing plate and the first divider, a second diffuser channel between the first divider and the shroud, and a valve controlling flow through the second diffuser channel. The valve moves between a first position and a second position. The first diffuser channel includes a first channel inlet and a first outlet. The second diffuser channel includes a second channel inlet adjacent to the first channel inlet and a second outlet adjacent to the first outlet.

A compressor includes a compressor housing with an inlet, an outlet, and a duct connecting the inlet to the outlet; an impeller within the duct in the compressor housing; and a variable diffuser within the duct and downstream from the impeller. The variable diffuser includes a backing plate, a shroud, a first divider between the backing plate and the shroud, a first diffuser channel between the backing plate and the first divider, a second diffuser channel between the first divider and the shroud, and a valve controlling flow through the second diffuser channel. The valve moves between a first position and a second position. The second channel is occluded when the valve is in the first position. The first diffuser channel includes a first channel inlet and a first outlet. The second diffuser channel includes a second channel inlet adjacent to the first channel inlet and a second outlet adjacent to the first outlet.

A variable diffuser includes a backing plate, a shroud, a first divider between the backing plate and the shroud, a second divider between the first divider and the shroud, and a third divider between the second divider and the shroud. The variable diffuser further includes a first diffuser channel between the backing plate and the first divider, a second diffuser channel between the first divider and the second divider, a third diffuser channel between the second divider and the third divider, a fourth diffuser channel between the third divider and the shroud, and a valve controlling flow through the second diffuser channel, the third diffuser channel, and the fourth diffuser channel. The first diffuser channel includes a first channel inlet and a first outlet. The second diffuser channel includes a second channel inlet adjacent to the first channel inlet and a second outlet adjacent to the first outlet. The third diffuser channel includes a third channel inlet adjacent to the second channel inlet and a third outlet adjacent to the second outlet. The fourth diffuser channel includes a fourth channel inlet adjacent to the third channel inlet and a fourth outlet adjacent to the third outlet.

DETAILED DESCRIPTION

A variable channel diffuser can include multiple diffuser channels and a valve to control flow through the channels. The valve can be actuated to obstruct certain channels while allowing air flow through other channels. The use of multiple channels controlled by a valve allows for the elimination of individual vanes (which are costly to produce and assemble) and reduces weight and part count of the diffuser system.

Figure 1A:
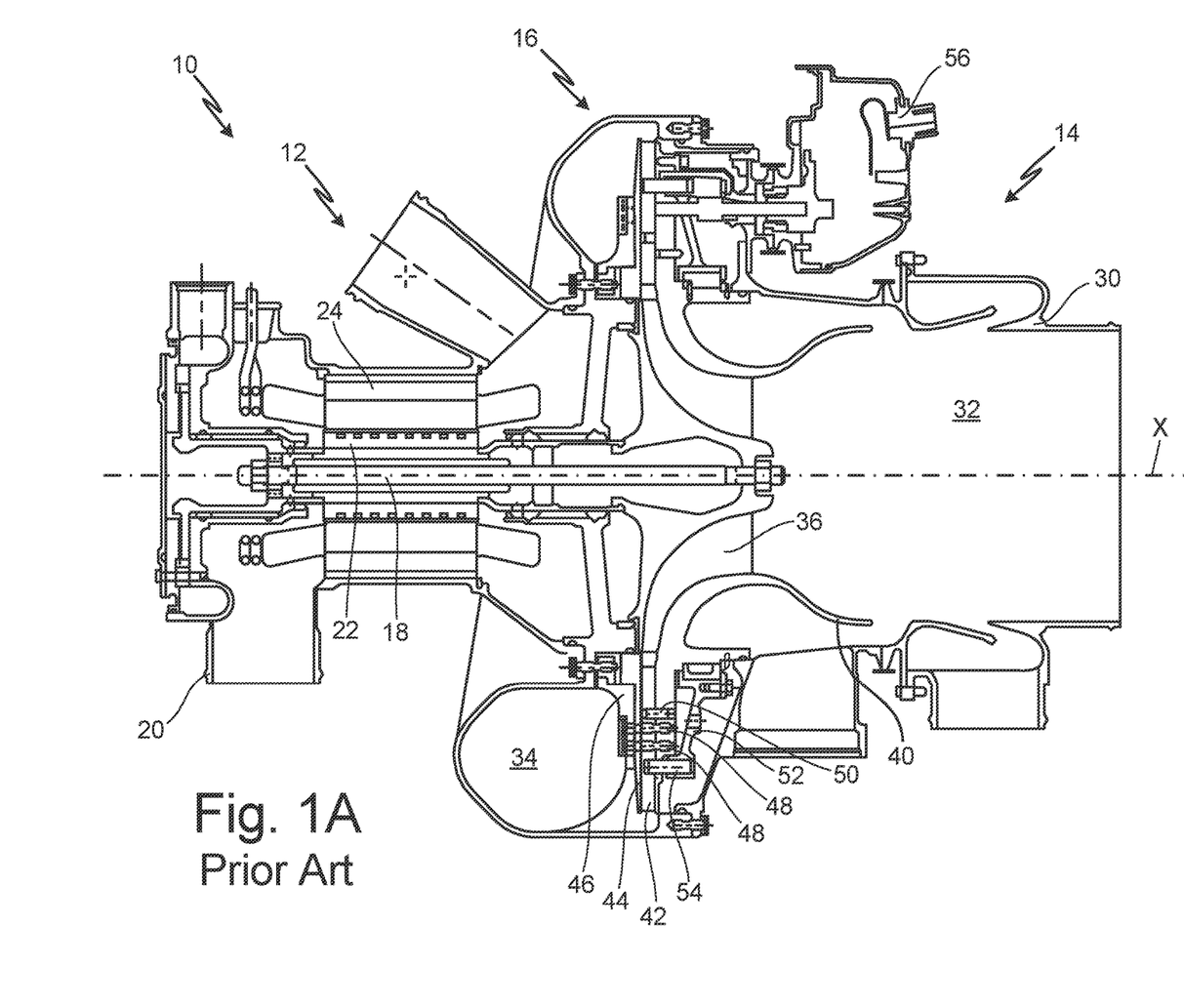
FIG. 1A is cross-sectional view of an air compressor with a prior art air variable diffuser.
Figure 1B:
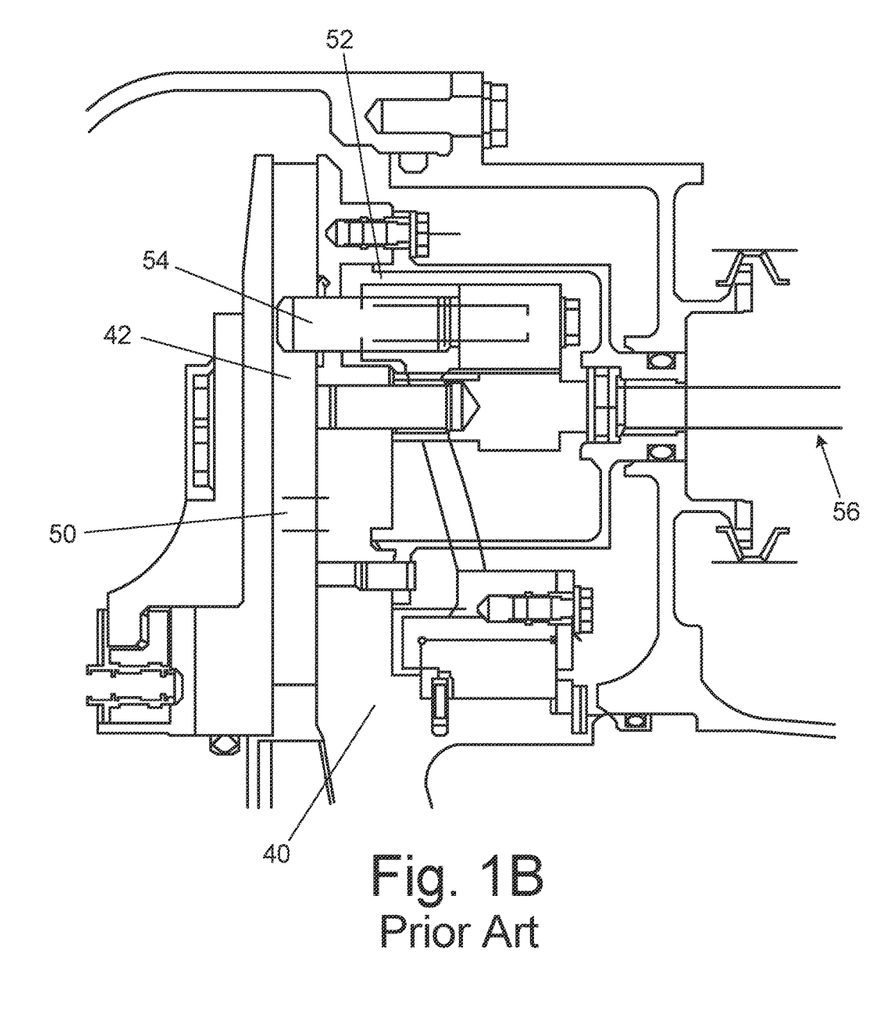
FIG. 1B is a cut-away cross-sectional view of the air compressor focused on the prior art variable diffuser.

FIG. 1A is cross-sectional view of prior art air compressor 10 with prior art variable diffuser 16. FIG. 1B is a cut-away cross-sectional view of prior art air compressor 10 focused on the prior art variable diffuser 16. FIGS. 1A-1B will be discussed together. Prior art air compressor 10 includes motor 12, compressor section 14, prior art variable diffuser 16, and tie rod 18. Also shown in FIG. 1 is axis X. Motor 12 drives compressor section 14 in prior art air compressor 10. Air enters compressor section 14 and then flows through prior art variable diffuser 16 before exiting compressor section 14. Tie rod 18 extends through prior art air compressor 10 and is centered on axis X. Motor 12 and compressor section 14 are mounted to tie rod 18. Motor 12 drives tie rod 18 and causes it to rotate, which in turn rotates compressor section 14.

Motor 12 includes motor housing 20, motor rotor 22, and motor stator 24. Motor housing 20 surrounds motor rotor 22 and motor stator 24. Motor 12 is an electric motor with motor rotor 22 disposed within motor stator 24. Motor rotor 22 is rotatable about axis X. Motor rotor 12 is mounted to tie rod 18 to drive rotation of tie rod 18 in prior art air compressor 10.

Compressor section 14 includes compressor housing 30, compressor inlet 32, compressor outlet 34, and compressor rotor 36. Compressor housing 30 includes a duct that forms compressor inlet 32 and a duct that forms compressor outlet 34. Compressor inlet 32 draws air into compressor section 14. One source of air is ram air collected from a ram air scoop positioned along the aircraft body. Compressor rotor 36 is positioned in compressor housing 30. Compressor rotor 36 is driven with motor 12 and is mounted on tie rod 18 to rotate with tie rod 18 about axis X. Air that is drawn into compressor section 14 through compressor inlet 32 is compressed with compressor rotor 36. The compressor air is then routed through prior art variable diffuser 16 before exiting compressor section 14 through compressor outlet 34.

Prior art variable diffuser 16 includes shroud 40, vanes 42, backing plate 44, mounting plate 46, fasteners 48, pivot pins 50, drive ring 52, drive pins 54, and diffuser actuator 56. Shroud 40 of prior art variable diffuser 16 can be attached to compressor housing 30. Vanes 42 are positioned between shroud 40 and backing plate 44. Backing plate 44 is held against vanes 42 with mounting plate 46. Fasteners 48 extend through openings in mounting plate 46, backing plate 44, vanes 42, and shroud 40. Vanes 42 are positioned between shroud 40 and backing plate 44 so that there is a small clearance between vanes 42 and shroud 40 and between vanes 42 and backing plate 44.

Pivot pins 50 extend between openings in vanes 42 and openings in shroud 40. Vanes 42 can rotate about pivot pins 50. Drive ring 52 is positioned adjacent shroud 40. Drive pins 54 extend from drive ring 52 through shroud 40 into a slot in vanes 42. Drive ring 52 can be rotated about axis X with diffuser actuator 56. As drive ring 52 is rotated, drive pins 54 engaged in the slots in vanes 42 will drag vanes 42 and cause them to rotate about pivot pins 50. This movement of vanes 42 will vary the gap between adjacent vanes 42 to vary the amount of air flowing between vanes 42.

Varying the amount of air that flows between vanes 42 allows prior art variable diffuser 16 to be used in different settings. First, when an aircraft is positioned on the ground the air that is taken into prior art variable diffuser 16 is typically at a pressure that is suitable for use in the cabin. Vanes 42 can thus be positioned to allow air to flow through prior art variable diffuser 16 without compressing the air. Alternatively, when an aircraft is in flight the air that is taken into prior art variable diffuser 16 is typically at a low pressure that is unsuitable for use in the cabin. Vanes 42 can thus be positioned to compress the air flowing through prior art variable diffuser 16 before that air is routed to an environmental control system.

Figure 2:
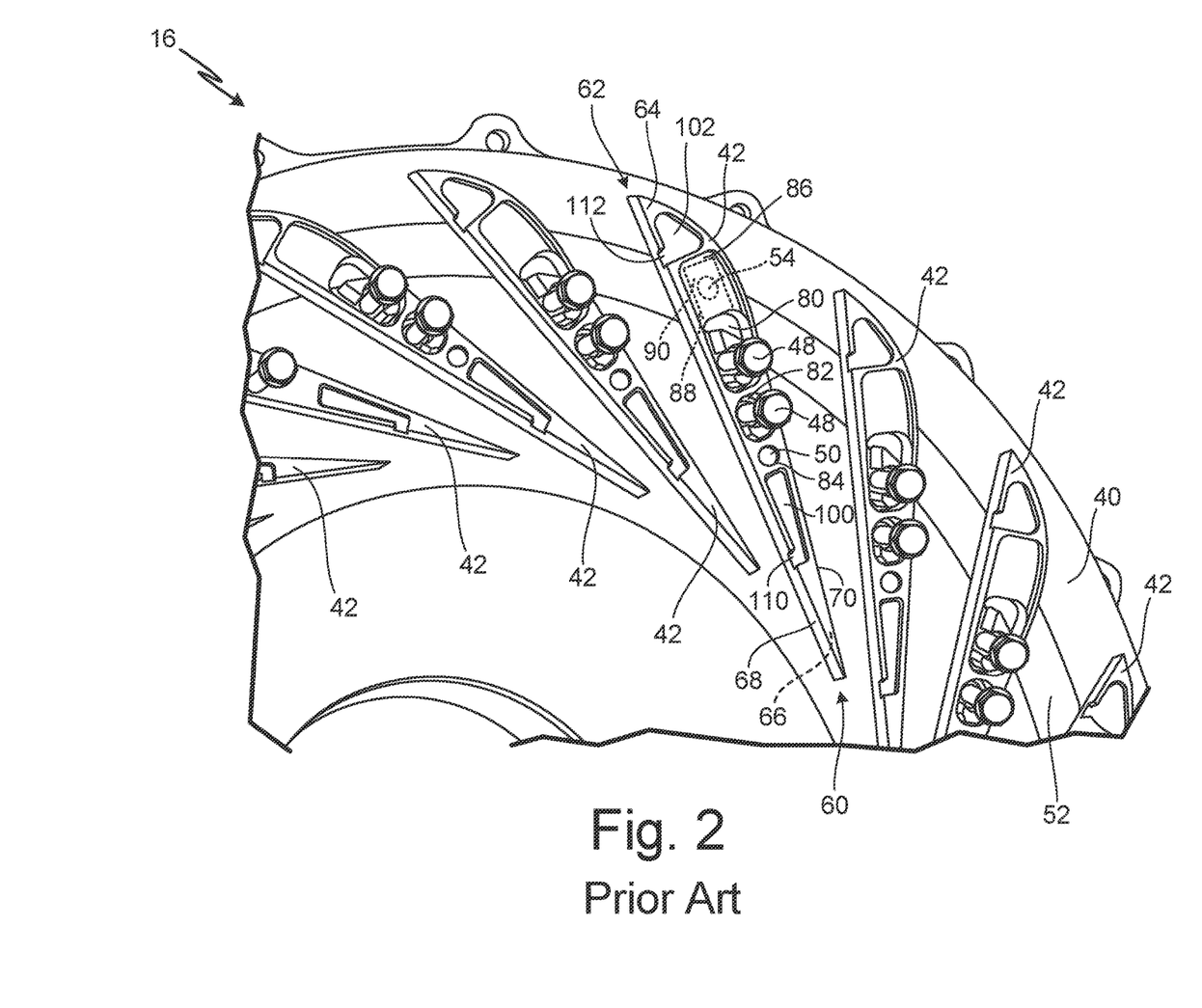
FIG. 2 is a perspective cut-away view of the prior art variable diffuser.

FIG. 2 is a perspective cut-away view of prior art variable diffuser 16. Prior art variable diffuser 16 includes shroud 40, vanes 42, fasteners 48, pivot pins 50, drive ring 52, and drive pins 54. Each vane 42 includes inlet end 60, outlet end 62, first surface 64, second surface 66, leading surface 68, trailing surface 70, first aperture 80, second aperture 82, third aperture 84, first recess 86, second recess 88, slot 90, first cavity 100, second cavity 102, a third cavity (not shown in FIG. 2), a fourth cavity (not shown in FIG. 2), first notch 110, second notch 112, a third notch (not shown in FIG. 2), and a fourth notch (not shown in FIG. 2).

Prior art variable diffuser 16 includes vanes 42 positioned on shroud 40. Fasteners 48 extend through a mounting plate (not shown in FIG. 2), a backing plate (not shown in FIG. 2), vanes 42, and shroud 40 to hold vanes 42 between the backing plate and shroud 40. Pivot pins 50 extend through vanes 42 and shroud 40 so that vanes 42 can pivot about pivot pins 50. Drive ring 52 is positioned adjacent shroud 40 and has a retaining ring that extends up to be flush with the surface of shroud 40 that abuts vanes 42. Drive pins 54 extend from drive ring 52 into vanes 42 to engage vanes 42. Drive ring 52 can be rotated, causing drive pins 54 to rotate vanes 42.

Vanes 42 are pivotally positioned in prior art variable diffuser 16. Each vane 42 includes inlet end 60 positioned radially inward in relation to prior art variable diffuser 16 and outlet end 62 positioned radially outward in relation to prior art variable diffuser 16. Each vane 42 also includes first surface 64 and second surface 66 extending from inlet end 60 to outlet end 62. First surface 64 abuts the backing plate 44 (shown in FIG. 1A) and second surface 64 abuts shroud 40. Each vane 42 also includes leading surface 68 and trailing surface 70 extending from inlet end 60 to outlet end 62. Leading surface 68 faces radially inward in relation to prior art variable diffuser 16 and trailing surface 70 faces radially outward in relation to prior art variable diffuser 16.

Each vane 42 includes first aperture 80 and second aperture 82 extending from first surface 64 to second surface 66. First aperture 80 receives one fastener 48 and second aperture 82 receives one fastener 48. First aperture 80 and second aperture 82 are sized so that first aperture 80 and second aperture 82 do not limit the movement of vane 42 when it pivots.

Each vane 42 also includes third aperture 84 extending from first surface 64 to second surface 66. Third aperture 84 is sized to receive pivot pin 50. Vanes 42 pivot on pivot pins 50. Each vane 42 further includes first recess 86, second recess 88, and slot 90. First recess 86 is positioned on first surface 64 of vane 42. Second recess 88 is positioned on second surface 66 of vane 42. Second recess 88 is positioned around slot 90. Slot 90 extends a distance into vane 42 from second surface 66. Slot 90 is sized to slidably engage drive pin 54. As drive ring 52 rotates, drive pins 54 can slide through slots 90 to rotate vanes 42 about pivot pins 50.

Each vane 42 further includes first cavity 100, second cavity 102, a third cavity, and a fourth cavity. First cavity 100 and second cavity 102 are positioned on first surface 64. The third cavity and the fourth cavity are positioned on second surface 66. The third cavity and the fourth cavity are not shown in FIG. 2, as the third cavity is positioned below first cavity 100 on second surface 66 facing shroud 40 and the fourth cavity is positioned below second cavity 102 on second surface 66 facing shroud 40. Vane 42 further includes first notch 110, second notch 112, a third notch, and a fourth notch. First notch 110 is on first surface 64 and extends from leading surface 68 to first cavity 100. Second notch 112 is on first surface 64 and extends from leading surface 68 to second cavity 102. The third notch is on second surface 66 and extends from trailing surface 70 to the third cavity. The fourth notch is on second surface 66 and extends from trailing surface 70 to the fourth cavity. The third notch and the fourth notch are not shown in FIG. 2, as they are positioned on second surface 66 facing shroud 40.

First cavity 110, second cavity 112, the third cavity, and the fourth cavity are included on vane 42 to load vane 42 against the backing plate (not shown in FIG. 2) to prevent vanes 42 from dithering, vibrating, and resonating. First notch 110, second notch 112, the third notch, and the fourth notch are included on vane 42 to vent first cavity 100, second cavity 102, the third cavity, and the fourth cavity, respectively. This allows air that is flowing through prior art variable diffuser 16 to flow into first cavity 100, second cavity 102, the third cavity, and the fourth cavity through first notch 110, second notch 112, the third notch, and the fourth notch, respectively. First cavity 100, second cavity 102, the third cavity, and the fourth cavity are vented to different pressures to create the load that holds vane 42 against the backing plate.

Figure 3:
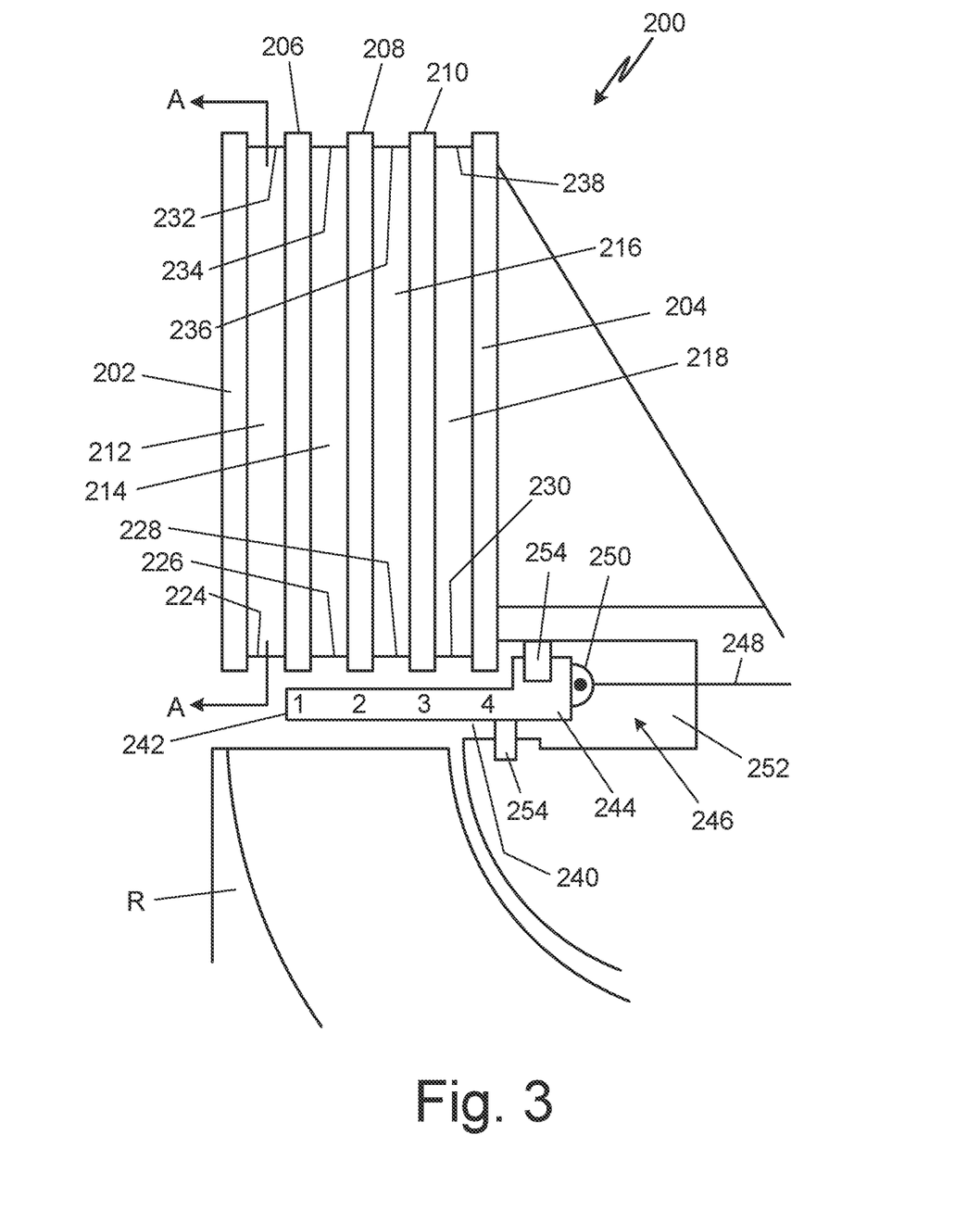
FIG. 3 is a schematic depiction of a variable diffuser having multiple channels.

FIG. 3 is a schematic depiction of variable diffuser 200. Variable diffuser 200 includes backing plate 202 (such as backing plate 44 shown in FIGS. 1A-2), shroud 204 (such as shroud 40 shown in FIGS. 1A and 2), first divider 206, second divider 208, third divider 210, first diffuser channel 212, second diffuser channel 214, third diffuser channel 216, and fourth diffuser channel 218. Variable diffuser 200 has inlets including first channel inlet 224, second channel inlet 226, third channel inlet 228, and fourth channel inlet 230. Variable diffuser 200 also has outlets including first channel outlet 232, second channel outlet 234, third channel outlet 236, and fourth channel outlet 238. Variable diffuser 200 also includes valve 240, with first end 242 and second end 244, actuator 246, with actuator arm 248 and linkage 250, cavity 252, and seals 254. Valve 240 also includes numbers 1-4 to indicate different positions where valve 240 rests. FIG. 3 also includes rotor R (such as compressor rotor 36 shown in FIGS. 1A-1B) which is situated upstream from variable diffuser 200.

Variable channel diffuser 200 has backing plate 202 at a first side and across from shroud 204 at a second side. First divider 206, second divider 208, and third divider 210 are between backing plate 202 and shroud 204 with first divider 206 closest to backing plate 202, third divider 210 closest to shroud 204, and second divider 208 between first divider 206 and third divider 210. First diffuser channel 212 is between backing plate 202 and first divider 206. Second diffuser channel 214 is between first divider 206 and second divider 208. Third diffuser channel 216 is between second divider 208 and third divider 210. Fourth diffuser channel 218 is between third divider 210 and shroud 204. The channels in variable diffuser 200 can include vanes or the channels can be vaneless. Variable diffuser 200 has inlets to each channel, including first channel inlet 224 to first diffuser channel 212, second channel inlet 226 to second diffuser channel 214, third channel inlet 228 to third diffuser channel 216, and fourth channel inlet 230 to fourth diffuser channel 218. First channel inlet 224, second channel inlet 226, third channel inlet 228, and fourth channel inlet 230 are adjacent to one another and located at an upstream portion of variable diffuser 200 near rotor R. Variable diffuser also has outlets to each channel, including first channel outlet 232 to first diffuser channel 212, second channel outlet 234 to second diffuser channel 214, third channel outlet 236 to third diffuser channel 216, and fourth channel outlet 238 to fourth diffuser channel 218. First channel outlet 23, second channel outlet 234, third channel outlet 236, and fourth channel outlet 238 are adjacent and located at a downstream portion of variable diffuser 200.

Variable diffuser 200 is shown with three dividers (first divider 206, second divider 208, and third divider 210) between four channels (first diffuser channel 212, second diffuser channel 214, third diffuser channel 216, and fourth diffuser channel 218). However, variable diffusers using dividers and channels like variable diffuser 200 can have any number N dividers with any number N+1 channels. Number N is a positive integer equal to or greater than 2. For example, a variable diffuser with channels could have 20 dividers between a backing plate (for example, backing plate 202) and a shroud (for example, shroud 204) with 21 channels between the backing plate, dividers, and shroud. Variable diffusers with channels (for example, variable diffuser 200) have an increased granularity as the number N of dividers increases.

In FIG. 3, valve 240 is at an upstream side of variable diffuser 200 adjacent to second channel inlet 226, third channel inlet 228, and fourth channel inlet 230. Alternatively, valve 240 can be located at the downstream portion of variable diffuser 200 near second channel outlet 234, third channel outlet 236, and fourth channel outlet 238. Positioning valve 240 near channel outlets 234-238 increases containment for rotor R and makes valve 240 easier to fit and maintain. Valve 240 can be a poppet valve with a long, thin end and a thickened head. First end 242 of valve 240 is a tip of the thin end. Second end 244 of valve 240 is the top of the head opposite the first end 242. FIG. 3 includes numbers 1-4 indicating four valve positions for valve 240. Valve 240 is connected to actuator 246. Actuator arm 248 is connected to second end 244 of valve 240 with linkage 250. Cavity 252 is a compartment for second end 244 of valve 240. Cavity 252 is separated from rotor R and the upstream side of variable diffuser 200 with seals 254.

Variable diffuser 200 operates in a similar manner as prior art variable diffuser 16 (described above in reference to FIGS. 1A-2). Variable diffuser 200 receives airflow at first diffuser channel 212, second diffuser channel 214, third diffuser channel 216, and fourth diffuser channel 218 from a compressor inlet (such as compressor inlet 32 shown in FIG. 1A) after the airflow has passed through rotor R (such as compressor rotor 36 shown in FIG. 1A). Variable diffuser 200 diffuses the airflow as air travels through first diffuser channel 212, second diffuser channel 214, third diffuser channel 216, and fourth diffuser channel 218 and out of first channel outlet 232, second channel outlet 234, third channel outlet 236, and fourth channel outlet 238, respectively.

Varying airflow through variable diffuser 200 is accomplished through moving valve 240 to open different numbers of channels. Variable diffuser 200 in FIG. 3 has four different channels, so valve 240 can be in four different positions. Valve 240 is in first position when first end 242 is beyond number 1 such that second diffuser channel 214, third diffuser channel 216, and fourth diffuser channel 218 are occluded by valve 240. Second position is when first end 242 is at number 2 and third diffuser channel 216 and fourth diffuser channel 218 are occluded by valve 240. Third position is when first end 242 is at number 3 and fourth diffuser channel 218 is occluded by valve 240. Fourth position is when end 242 is at number 4 and first diffuser channel 212, second diffuser channel 214, third diffuser channel 216, and fourth diffuser channel 218 are all open. Actuator 246 moves valve 240 between the four different positions depending on the need for compressed air in an aircraft. Actuator 246 can be aided by use of servo pressure in cavity 252, as will be described in relation to FIG. 6. Valve 240 can be between numbered positions. When second diffuser channel 214, third diffuser channel 216, and/or fourth diffuser channel 218 is occluded, air does not flow through the occluded channel and "dead air" fills the channel.

Variable diffuser 200 allows for a variety of settings, as described in relation to prior art variable diffuser 16 relating to FIGS. 1A-1B. Variable diffuser 200 has fewer moving pieces than other variable diffusers, thereby having reduced weight, construction complexity, and cost to build and maintain. Valve 240 and actuator 248 are comparatively less expensive than traditional gearing in other variable diffusers. Variable diffuser 200 has no channel-to-channel losses, making it efficient.

Figure 4:
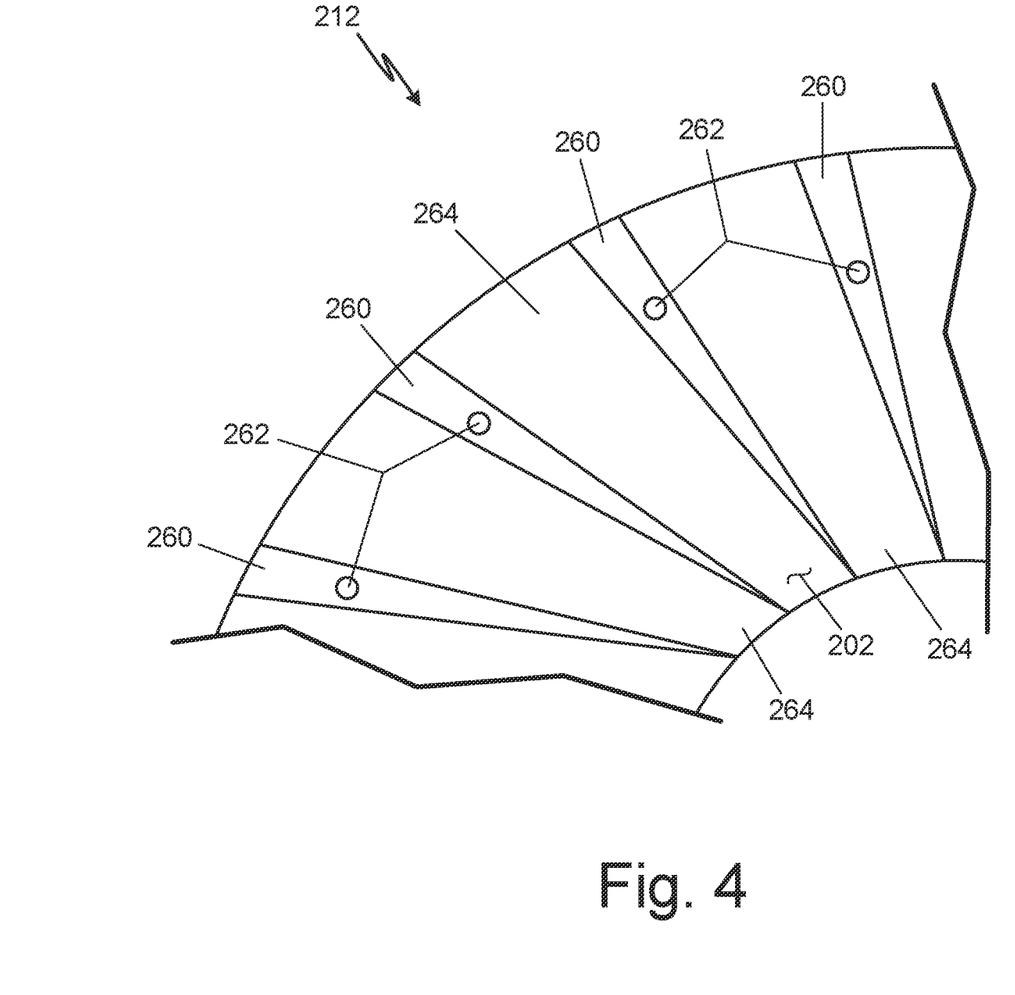
FIG. 4 is a schematic cross-sectional depiction of the variable diffuser taken along line A-A of FIG. 3.

FIG. 4 is a schematic cross-sectional depiction of first diffuser channel 212 taken along line A-A of FIG. 3. FIG. 4 shows backing plate 202, vanes 260, fasteners 262, and passages 264. Vanes 260 are held in place in first diffuser channel 212 by fasteners 260 through vanes 260. Vanes 260 can be elongated triangle shapes. Passages 264 are between vanes 260. Vanes can alternatively be formed integrally with backing plate 202 through casting or additive manufacturing techniques. Vanes 260 are used to help diffuse air moving through first diffuser channel 212. Other channels in variable diffuser 200 can also include vanes 260 and passages 264. Widths of vanes 260 and passages 264 can also be increased or decreased depending on the needs of an air compressor utilizing variable diffuser 200. Different passages can also have different configurations for vanes 260.

Figure 5:
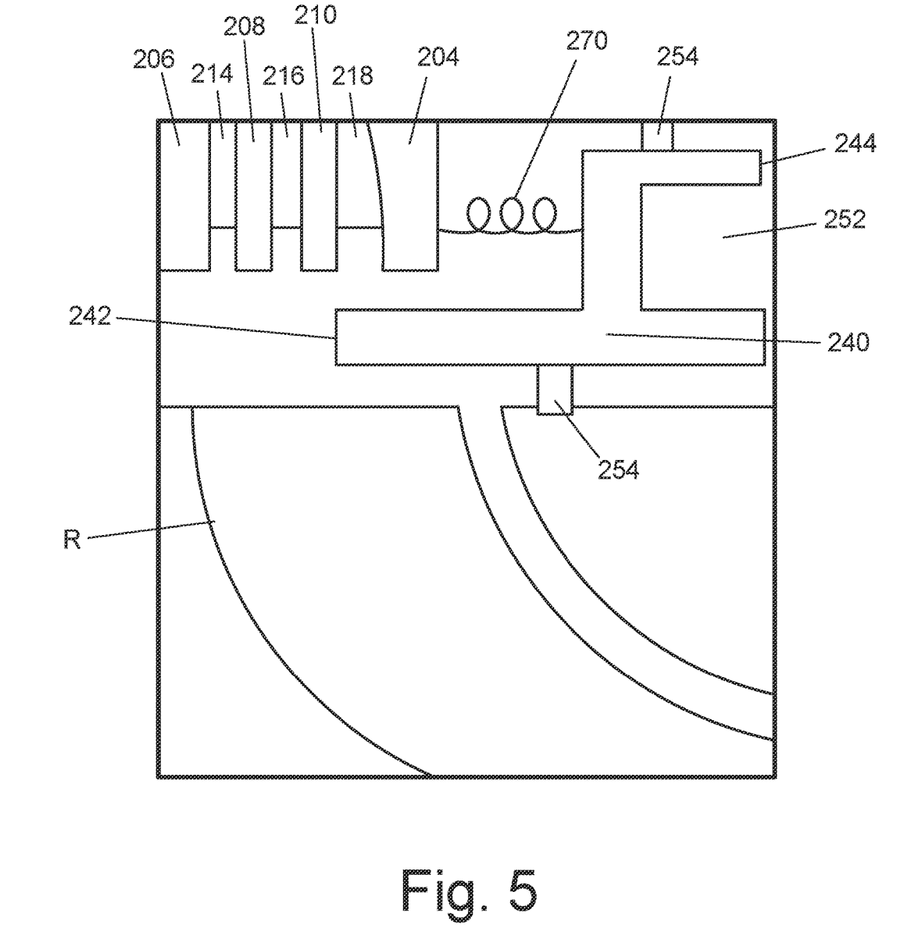
FIG. 5 is schematic depiction of a valve in the variable diffuser of FIG. 3.

FIG. 5 is a schematic depiction of valve 240 in variable diffuser 200. FIG. 5 includes shroud 204, first divider 212, second divider 214, third divider, 216, second diffuser channel 214, third diffuser channel 216, fourth diffuser channel 218, valve 240 (with first end 242 and second end 244), cavity 252, seals 254, and spring 270. FIG. 5 also includes rotor R.

Variable diffuser 200 shown in FIG. 5 has a similar structure and function as variable diffuser 200 in FIG. 3 with respect to shroud 204, first divider 212, second divider 214, third divider 216, second diffuser channel 214, third diffuser channel 216, fourth diffuser channel 218, valve 240, cavity 252, and seals 254. An alternative configuration of second end 244 of valve 240 is shown in FIG. 5. Second end 244 of valve 240 has a generally C-shape. One seal 254 abuts a top of second end 244 and a second seal 254 abuts a bottom of second end 244. A center of the C-shape of second end 244 is open to connect a linkage (for example, linkage 246 as shown in FIG. 3) and an actuator arm (for example, actuator arm 248 as shown in FIG. 3). Additionally, the C-shape allows second end 244 of valve 240 to be a poppet valve that can be moved using servo pressure, as will be described in more detail in FIG. 6.

FIG. 5 also shows spring 270, which is positioned between a portion of shroud 204 and second end 244 of valve 240. Spring 270 helps return valve 240 to a default position. The default position could be the first position, the second position, the third position, or the fourth position as described in relation to FIG. 3. For example, the default position for valve 240 could be the fourth position where second diffuser channel 214, third diffuser channel 216, and fourth diffuser channel 218 are open (as discussed in relation to FIG. 3). In this example, the default position is set such that spring 270 is compressed when less compressed air is needed for the aircraft, such as when the aircraft is on the ground and ambient pressure is sufficient for the aircraft cabin. When spring 270 is fully compressed, valve 240 will be in the first position and air will flow through second diffuser channel 214. When spring 270 is fully relaxed, air will flow through all three channels 214-218. Spring 270 could be fully relaxed during flight to compress ambient air with low pressure to be suitable for the aircraft cabin. Spring 270 can be compressed by use of an actuator (for example, actuator 250, as described in relation to FIG. 3) or servo pressure (as will be described below in relation to FIG. 6). Changing the default setting of spring 240 can program variable diffuser 200 to run in different modes under different circumstances.

Figure 6:
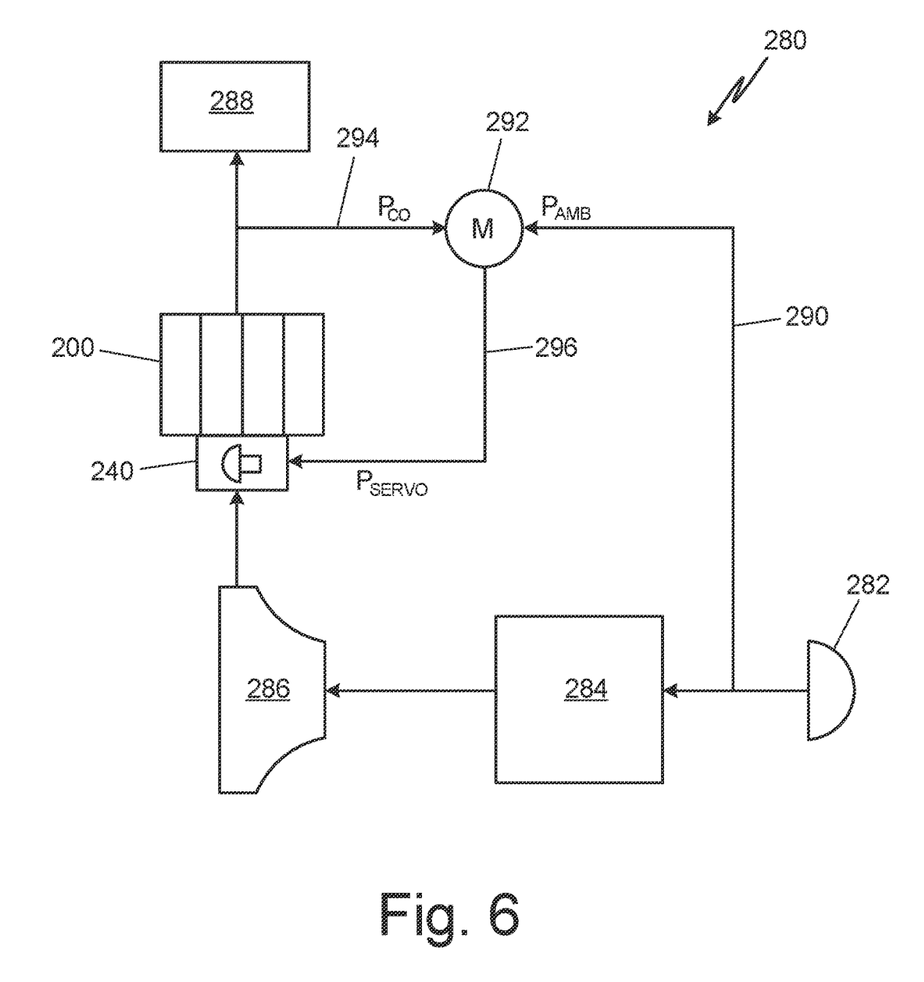
FIG. 6 is a schematic depiction of an air compressor including a variable diffuser having multiple channels.

FIG. 6 is a schematic depiction of air compressor 280 including variable diffuser 200. Air compressor 280 includes ram air scoop 282, compressor housing inlet 284, compressor rotor 286, variable diffuser 200 with valve 240, and compressor housing outlet 288. Air compressor 280 also includes a servo pressure system with ambient pressure air duct 290, motor 292, compressed pressure air duct 294, and servo pressure air duct 296.

Ram air scoop 282 is located along a body of an aircraft and ducts ambient air into compressor 280. Compressor 280 has a compressor housing (for example, compressor housing 30 shown in FIG. 1A). Compressor housing inlet 284, compressor rotor 286, variable diffuser 200 with valve 240, and compressor housing outlet 288 are all located in the compressor housing. Compressor 280 operates similarly to compressor 10. Compressor inlet 284 receives air from ram air scoop 282 and moves air toward impeller 286. Air then moves through impeller 286 where velocity increases. Impeller 286 is upstream from variable diffuser 200. Valve 240 moves to determine which channels in variable diffuser 200 are open. Air moves from impeller 286 past valve 240 and into open channels in variable diffuser 200. In variable diffuser 200, air loses velocity and increases in pressure. Compressed air moves out of variable diffuser 200 toward compressor housing outlet 288.

Compressor 280 includes a servo pressure system to control valve 240 using servo pressure. Ambient pressure air duct 290 connects ram air scoop 290 with motor 292. Compressed pressure air duct 294 connects a portion of the compressor housing downstream from variable diffuser 200 with motor 292. Alternatively, compressed pressure air duct 294 could use air from a heat exchanger downstream of compressor 280. Servo pressure air duct 296 connects motor 292 to valve 240. Motor 292 can be a torque motor and can also include an orifice. Motor 292 combines air at an ambient pressure ($P_{AMB}$) with air at a compressed pressure ($P_{COMP}$). Ambient pressure depends on the altitude of the aircraft. Compressed pressure depends on how many channels (for example, first diffuser channel 212 through fourth diffuser channel 218 in FIG. 3) are open. Motor 292 creates air at a servo pressure ($P_{SERVO}$) by mixing ambient pressure air and compressed pressure air. Servo pressure air duct 294 moves air at a servo pressure ($P_{SERVO}$) to control valve 240.

Air at a servo pressure ($P_{SERVO}$) can be used to move valve 240. Servo pressure air duct 296 can connect to a cavity with valve 240 (for example, cavity 252 in FIGS. 3-4). When servo pressure is higher than pressure within the compressor housing between rotor 286 and variable diffuser 200, then servo pressure can drive valve 240 to move between various positions (for example, positions 1-4, as discussed in relation to FIG. 3). Servo pressure can also be used with an actuator (for example, actuator 250 in FIG. 3) to help reduce the load on the actuator, thus increasing actuator lifespan.

A variable channel diffuser as described herein provides numerous advantages. The number of wear surfaces are greatly reduced as compared to a diffuser including vanes. Time and costs relating to manufacturing, assembly, and maintenance can be reduced due to a lower number of parts. Finally, the use of a variable channel diffuser can decrease system weight as compared to conventional vaned diffusers.

Discussion of Possible Embodiments

The following are non-exclusive descriptions of possible embodiments of the present invention.

A variable diffuser includes a backing plate, a shroud, a first divider between the backing plate and the shroud, a first diffuser channel between the backing plate and the first divider, a second diffuser channel between the first divider and the shroud, the second diffuser channel, and a valve controlling flow through the second diffuser channel. The valve moves between a first position and a second position. The first diffuser channel includes a first channel inlet and a first outlet. The second diffuser channel includes a second channel inlet adjacent to the first channel inlet and a second outlet adjacent to the first outlet.

The variable diffuser of the preceding paragraph can optionally include, additionally and/or alternatively, any one or more of the following features, configurations and/or additional components:

A further embodiment of the foregoing variable diffuser, wherein the second channel is occluded when the valve is in the first position, and wherein the second channel is open when the valve is in the second position.

A further embodiment of any of the foregoing variable diffusers, wherein the valve is adjacent to the second outlet.

A further embodiment of any of the foregoing variable diffusers, wherein the first diffuser channel further comprises a first plurality of vanes positioned between the backing plate and the first divider, and wherein the second diffuser channel further comprises a second plurality of vanes positioned between the first divider and the shroud.

A further embodiment of any of the foregoing variable diffusers, wherein the valve is adjacent to the first channel inlet and the second channel inlet.

A further embodiment of any of the foregoing variable diffusers, wherein the valve is a poppet valve.

A further embodiment of any of the foregoing variable diffusers, wherein a servo pressure duct connects to the valve to move the valve between the first position and the second position.

A further embodiment of any of the foregoing variable diffusers, wherein the valve is linked to an actuator and a servo pressure duct, and wherein the valve is controlled by the group consisting of servo pressure, the linear actuator, or combinations thereof.

A compressor includes a compressor housing, an impeller within the duct in the compressor housing, and a variable diffuser within the duct and downstream from the impeller. The compressor housing includes an inlet, an outlet, and a duct connecting the inlet to the outlet. The variable diffuser includes a backing plate, a shroud, a first divider between the backing plate and the shroud, a first diffuser channel between the backing plate and the first divider, a second diffuser channel between the first divider and the shroud, a valve controlling flow through the second diffuser channel. The first diffuser channel includes a first channel inlet and a first outlet. The second diffuser channel includes a second channel inlet adjacent to the first channel inlet and a second outlet adjacent to the first outlet. The valve is movable between a first position and a second position. The second channel is occluded when the valve is in the first position and the second channel is open when the valve is in the second position.

The compressor of the preceding paragraph can optionally include, additionally and/or alternatively, any one or more of the following features, configurations and/or additional components:

A further embodiment of the foregoing compressor, wherein the valve of the variable diffuser is a poppet valve.

A further embodiment of any of the foregoing compressors, wherein the poppet valve connects to a servo pressure system that provides air at a servo pressure to move the valve between the first position and the second position.

A further embodiment of any of the foregoing compressors, wherein the servo pressure system includes a motor with an input and an output, an ambient pressure duct connecting a ram air source and the motor input, a compressed pressure duct connecting a portion of the compressor housing duct downstream from the variable diffuser with the motor input, and a servo pressure duct connecting the motor output with the poppet valve. The motor combines air from the ambient pressure duct with air from the compressed pressure duct to create air with servo pressure.

A further embodiment of any of the foregoing compressors, wherein the motor is chosen from the group consisting of a torque motor, an orifice, and combinations thereof.

A further embodiment of any of the foregoing compressors, wherein the valve is connected to a spring to return the valve to a default position, and wherein the default position is the first position or the second position.

A further embodiment of any of the foregoing compressors, wherein an actuator moves the valve between the first position and the second position.

A further embodiment of any of the foregoing compressors, wherein the actuator is a linear actuator connected to the valve with a linkage.

A further embodiment of any of the foregoing compressors, wherein the valve is adjacent the second channel inlet of the second diffuser inlet.

A further embodiment of any of the foregoing compressors, wherein the first diffuser channel further comprises a first plurality of vanes positioned between the backing plate and the first divider, and wherein the second diffuser channel further comprises a second plurality of vanes positioned between the first divider and the shroud.

A variable diffuser includes a backing plate, a shroud, a first divider between the backing plate and the shroud, a second divider between the first divider and the shroud, and a third divider between the second divider and the shroud. The variable diffuser further includes a first diffuser channel between the backing plate and the first divider, a second diffuser channel between the first divider and the second divider, the second diffuser channel, a third diffuser channel between the second divider and the third divider, a fourth diffuser channel between the third divider and the shroud, and a valve controlling flow through the second diffuser channel, the third diffuser channel, and the fourth diffuser channel. The first diffuser channel includes a first channel inlet and a first outlet. The second diffuser channel includes a second channel inlet adjacent to the first channel inlet and a second outlet adjacent to the first outlet. The third diffuser channel includes a third channel inlet adjacent to the second channel inlet and a third outlet adjacent to the second outlet. The fourth diffuser channel includes a fourth channel inlet adjacent to the third channel inlet and a fourth outlet adjacent to the third outlet.

The variable diffuser of the preceding paragraph can optionally include, additionally and/or alternatively, any one or more of the following features, configurations and/or additional components:

A further embodiment of the foregoing variable diffuser, wherein the valve movably occludes the second diffuser channel, the third diffuser channel, and the fourth diffuser channel, and wherein the valve is connected to a servo pressure duct to control movement of the valve.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A variable diffuser comprising:
   a backing plate;
   a shroud;
   a first divider between the backing plate and the shroud;
   a first diffuser channel between the backing plate and the first divider, the first diffuser channel comprising:
      a first channel inlet; and
      a first outlet;
   a second diffuser channel between the first divider and the shroud, the second diffuser channel comprising:
      a second channel inlet adjacent to the first channel inlet; and
      a second outlet adjacent to the first outlet; and
   a valve controlling flow through the second diffuser channel, wherein the valve moves between a first position and a second position, wherein the valve is connected to a servo pressure duct which provides servo pressure air to move the valve between the first position and the second position, and wherein the servo pressure air is a mixture of ambient pressure air and compressed pressure air.

2. The variable diffuser of claim 1, wherein the second diffuser channel is occluded when the valve is in the first position, and wherein the second channel is open when the valve is in the second position.

3. The variable diffuser of claim 1, wherein the valve is adjacent to the second outlet.

4. The variable diffuser of claim 1, wherein the first diffuser channel further comprises a first plurality of vanes positioned between the backing plate and the first divider, and wherein the second diffuser channel further comprises a second plurality of vanes positioned between the first divider and the shroud.

5. The variable diffuser of claim 1, wherein the valve is adjacent to the first channel inlet and the second channel inlet.

6. The variable diffuser of claim 1, wherein the valve is a poppet valve.

7. The variable diffuser of claim 1, wherein the valve is linked to an actuator, and wherein the valve is controlled by the servo pressure air and the actuator.

8. A compressor comprising:
   a compressor housing comprising:
      an inlet;
      an outlet; and
      a duct connecting the inlet to the outlet;
   an impeller within the duct in the compressor housing; and
   a variable diffuser within the duct and downstream from the impeller, the variable diffuser comprising:
      a backing plate;
      a shroud;
      a first divider between the backing plate and the shroud;
      a first diffuser channel between the backing plate and the first divider, the first diffuser channel comprising:
         a first channel inlet; and
         a first outlet;
      a second diffuser channel between the first divider and the shroud, the second diffuser channel comprising:
         a second channel inlet adjacent to the first channel inlet; and
         a second outlet adjacent to the first outlet;
      a valve in a cavity of the housing, the valve controlling flow through the second diffuser channel and movable between a first position and a second position, wherein the second channel is occluded when the valve is in the first position, and wherein the second channel is open when the valve is in the second position; and
   a servo pressure system to provide servo pressure air to the cavity to move the valve of the variable diffuser, the servo pressure system comprising:
      a motor with an input and an output;
      an ambient pressure duct connecting the motor input and an ambient pressure air source upstream of the compressor impeller;
      a compressed pressure duct connecting the motor input and a compressed pressure air source downstream of the compressor impeller; and
      a servo pressure duct connecting the motor output and the cavity;
      wherein the motor combines the ambient pressure air from the ambient pressure duct with compressed pressure air from the compressed pressure duct to create servo pressure air; and
      wherein the servo pressure air in the cavity from the servo pressure duct moves the valve between the first position and the second position.

9. The compressor of claim 8, wherein the valve of the variable diffuser is a poppet valve.

10. The compressor of claim 8, wherein the motor is a torque motor.

11. The compressor of claim 8, wherein the valve is connected to a spring to return the valve to a default position, and wherein the default position is the first position or the second position.

12. The compressor of claim 8, wherein an actuator is used with the servo pressure system to move the valve between the first position and the second position.

13. The compressor of claim 12, wherein the actuator is a linear actuator connected to the valve with a linkage.

14. The compressor of claim 8, wherein the cavity and the valve are adjacent to the second channel inlet of the second diffuser inlet.

15. The compressor of claim 8, wherein the first diffuser channel further comprises a first plurality of vanes positioned between the backing plate and the first divider, and wherein the second diffuser channel further comprises a second plurality of vanes positioned between the first divider and the shroud.

16. The compressor of claim 8, wherein the ambient pressure duct is connected to a ram air source and the ambient pressure air is ram air.

17. The compressor of claim 16, wherein the ram air source is the compressor housing inlet.

18. The compressor of claim 8, wherein the compressed pressure duct is connected downstream of the variable diffuser and upstream from the compressor housing outlet.

19. The compressor of claim 8, wherein the compressed pressure duct is connected downstream of the compressor housing outlet.

20. A variable diffuser comprising:
   a backing plate;
   a shroud;

a first divider between the backing plate and the shroud;
a second divider between the first divider and the shroud;
a third divider between the second divider and the shroud;
a first diffuser channel between the backing plate and the first divider, the first diffuser channel comprising:
- a first channel inlet; and
- a first outlet;

a second diffuser channel between the first divider and the second divider, the second diffuser channel comprising:
- a second channel inlet adjacent to the first channel inlet; and
- a second outlet adjacent to the first outlet;

a third diffuser channel between the second divider and the third divider, the third diffuser channel comprising:
- a third channel inlet adjacent to the second channel inlet; and
- a third outlet adjacent to the second outlet;

a fourth diffuser channel between the third divider and the shroud, the fourth diffuser channel comprising:
- a fourth channel inlet adjacent to the third channel inlet; and
- a fourth outlet adjacent to the third outlet; and a valve controlling flow through the second diffuser channel, the third diffuser channel, and the fourth diffuser channel by movably occluding the second diffuser channel, the third diffuser channel, and the fourth diffuser channel, and wherein the valve is connected to a servo pressure duct which provides servo pressure air to control movement of the valve; and wherein the servo pressure air is a mixture of ambient pressure air and compressed pressure air.

* * * * *